United States Patent
Vinciarelli et al.

(10) Patent No.: US 10,135,334 B1
(45) Date of Patent: Nov. 20, 2018

(54) BUCK-BOOST CONVERTER WITH SECONDARY CIRCUIT

(71) Applicant: VLT, Inc., Sunnyvale, CA (US)

(72) Inventors: Patrizio Vinciarelli, Sunnyvale, CA (US); Steven Montminy, Sunnyvale, CA (US); Wesley Roach, Sunnyvale, CA (US)

(73) Assignee: VLT, Inc., Sunnyvale, CA (US)

( * ) Notice: Subject to any disclaimer, the term of this patent is extended or adjusted under 35 U.S.C. 154(b) by 0 days.

(21) Appl. No.: 15/634,817

(22) Filed: Jun. 27, 2017

(51) Int. Cl.
*G05F 1/253* (2006.01)
*H02M 3/156* (2006.01)
*H02M 1/08* (2006.01)
*H02M 1/00* (2006.01)

(52) U.S. Cl.
CPC ........... *H02M 3/156* (2013.01); *H02M 1/083* (2013.01); *H02M 2001/0048* (2013.01)

(58) Field of Classification Search
CPC ......... H02M 3/1582; H02M 2001/007; H02M 1/084; G05F 1/253; H02J 1/08; Y10T 307/406
USPC ....... 323/295, 207, 222, 262, 266, 267, 288, 323/906; 363/16–17, 95–98, 131, 132, 363/56.02
See application file for complete search history.

(56) References Cited

U.S. PATENT DOCUMENTS

| | | | | |
|---|---|---|---|---|
| 5,528,482 A * | 6/1996 | Rozman | ............ | H02M 3/33569 327/309 |
| 6,961,015 B2 * | 11/2005 | Kernahan | ............. | H02M 3/157 341/155 |
| 7,589,517 B1 * | 9/2009 | Broach | ................. | H02M 3/156 323/288 |
| 8,040,704 B2 * | 10/2011 | Cuk | ........................ | H02M 1/34 363/17 |
| 8,138,731 B2 * | 3/2012 | Chen | ................... | H02M 3/1584 323/272 |
| 8,587,267 B2 * | 11/2013 | Suntio | ................. | H02M 3/1582 323/262 |
| 8,670,247 B2 * | 3/2014 | Mase | ...................... | H02M 1/36 363/125 |
| 9,300,206 B2 * | 3/2016 | Ye | ........................ | H02M 1/4225 |
| 2013/0009479 A1 * | 1/2013 | Khanna | ............... | H02M 3/1584 307/58 |

* cited by examiner

Primary Examiner — Rajnikant Patel
(74) Attorney, Agent, or Firm — Foley & Lardner LLP (57) ABSTRACT

A switching power conversion system includes a main power circuit structured to convert power from a power source at an input voltage to an output voltage using a first inductive current. The power conversion system also includes a secondary power circuit structured to scale the first inductive current to a second inductive current smaller than the first inductive current by a scaling factor. A controller is configured to control operations of the main power circuit and the secondary power circuit. Zero voltage switching (ZVS) and zero current switching (ZCS) is detected by sensing voltages across switches on the secondary power circuit. Accuracy can thus be improved. Output current of the conversion system is also determined by monitoring the voltage across a sense resistor in the secondary power circuit, which is a scaled representation of the output current, thus power loss can be reduced.

34 Claims, 4 Drawing Sheets

FIG. 1

| | $t_0$ INPUT PHASE | $t_1$ ZVS Q3 | $t_2$ IN-OUT PHASE | $t_3$ ZVS Q2 | $t_4$ FREEWHEEL PHASE | $t_5$ ZVS Q4 | $t_6$ CLAMPED PHASE | $t_7$ ZVS Q1 | $t_8$ |
|---|---|---|---|---|---|---|---|---|---|
| Q1 | ON | ON | ON | | | | | | |
| Q2 | | | | ON | ON | ON | ON | | |
| Q3 | | | ON | ON | ON | | | | |
| Q4 | ON | | ON | ON | ON | | ON | ON | |
| Q3B | | | | | | | | | |
| Q4B | ON | | | | | | ON | ON | |

BUCK-BOOST CONVERTER WITH SECONDARY CIRCUIT

TECHNICAL FIELD

This disclosure relates to systems and methods for electrical power conversion. According to illustrative implementations, the present disclosure relates to direct current to direct current (DC-DC) switching power conversion, including buck, boost, and buck boost topologies.

BACKGROUND

A buck-boost DC-DC converter refers to a power converter in which an input operating voltage delivered to the converter may span a range of values extending below and above the magnitude of the DC voltage delivered at the output of the converter. Buck-boost DC-DC converters find various applications in electrical and electronic equipment and systems. As an example, in a stationary or portable system powered by a DC battery, it may be desirable to maintain the output voltage at a substantially constant level regardless of the state of charge and voltage of the battery.

In a non-idealized switching converter, i.e., switches used in the converter have parasitic capacitances and inductances, power may be dissipated in a switch when the switch is being turned on, which is called "switching loss." Capacitances, both parasitic and lumped, across a switch if not discharged before the switch is turned ON may be a major contributor to switching loss. One way to reduce switching loss in a switching power converter (e.g., a buck, a boost, or a buck-boost switching power converter) uses an inductive current to fully or partially charge and discharge the capacitances associated with a switch before turning it ON to achieve full or partial zero voltage switching ("ZVS") during an energy recycling interval ("ERI") (which may also be called a "ZVS" interval). ZVS ideally causes the voltage across the switch to decline to zero volts, essentially eliminating switching losses associated with the capacitive discharge of the switch; however, any significant reduction, e.g. by 50 percent, 80 percent, 90 percent, or more from the peak voltage across the switch, respectively reduces the switching losses during turn ON by 75 percent, 96 percent, 99 percent, or more. However, it may be difficult to control switches to turn ON or OFF at times when the voltage across the switch is at zero volts or a minimum voltage due to a variety of factors, including fast voltage or current transitions, very small signals, propagation delays, and noise in the converter. Turning switches ON and OFF at times when zero or minimal current is flowing through the switch, called zero current switching ("ZCS"), can also reduce losses and reduce noise. However, ZCS operation of switches also may be difficult for the same reasons as with ZVS.

Besides difficulty in ZVS and ZCS operations, it may also be difficult to sense the output current for a converter without dissipating excessive power. Typically, a sense resistor is connected in series with the load at the output side of the converter and the voltage across the sense resistor is sensed to monitor the output current. A trade-off between the need for sufficient signal voltage across the resistor, e.g. relative to noise, and power dissipation in the resistor, may lead to significant power consumption in the resistor, impacting converter efficiency.

SUMMARY

An example switching power conversion system includes a main switching power circuit structured to convert power received via an input from a power source at an input voltage for delivery via an output at an output voltage to a load. The main switching power circuit includes a first inductor and is structured to have a first inductive current flowing through the first inductor during operation. The switching power conversion system also includes a secondary switching power circuit structured to scale the first inductive current to a second inductive current smaller than the first inductive current by a scaling factor. The switching power conversion system further includes a controller configured to control selected operations of the main switching power circuit and the secondary switching power circuit by monitoring circuit conditions in the secondary switching power circuit, such as voltages across one or more switches and a current through one or more switches or a sense resistor connected between the output of the secondary power circuit and the load.

Another example switching power conversion system is for converting power received via an input from a power source at an input voltage for delivery at an output voltage for supplying a load. The power conversion system includes a main switching power circuit, a secondary switching power circuit, and a controller. The main switching power circuit includes a first leg connected to the input to receive power from the power source and including a first switch and a second switch, a second leg connected to the output to deliver power to the load and including a third switch and a fourth switch, and a first inductor connecting a first node between the first switch and the second switch to a second node between the third switch and the fourth switch for carrying a first inductive current flowing through the first inductor during operation to convert power from the input to the output. The secondary switching power circuit includes a third leg and a second inductor. The third leg includes a fifth switch, a sixth switch, and a resistor. The second inductor has a first end connected to the first inductor and a second end connected to the third leg adapted to carry a second inductive current flowing through the second inductor during operation, wherein the second inductive current is smaller than the first inductive current by a scaling factor A. The controller is configured to monitor circuit conditions in the secondary switching power circuit and selectively control switches in the main and secondary switching power circuits based upon the monitoring.

An example method for converting power includes providing a main switching power circuit for converting power from a power source at an input voltage to an output voltage supplying a load. The main switching power circuit includes a first leg connected to receive power from a power source including a first switch and a second switch, a second leg connected to the load and including a third switch and a fourth switch, and a first inductor connecting a first node between the first switch and the second switch to a second node between the third switch and the fourth switch. A first inductive current flows through the first inductor during operation to transfer power between the power source and the load. The method also includes providing a secondary switching power circuit for scaling the first inductive current to a second inductive current smaller than the first inductive current by a scaling factor A. The secondary switching power circuit includes a third leg and a second inductor. The third leg includes a fifth switch, a sixth switch, and a resistor. The second inductor is connected to the first inductor. The second inductive current flows through the second inductor during operation. The method further includes monitoring at least one of a voltage across or a current through a component of the secondary switching power circuit and selectively controlling switches in the main and secondary switching power circuits based upon the monitoring.

Some embodiments of the above example methods and apparatus may include one or more of the following features. In some embodiments, a DC resistance of the second inductor $R_{DC_{LB}}$ and a DC resistance of the first inductor $R_{DC_L}$ have a relationship of: $R_{DC_{LB}} = A*R_{DC_L}$, a drain to source resistance of the fifth switch $R_{DS_{Q3B}}$ and a drain to source resistance of the third switch have a relationship of: $R_{DS_{Q3B}} = A*R_{DS_{Q3}}$, a drain to source resistance of the sixth switch $R_{DS_{Q4B}}$ and a drain to source resistance of the fourth switch have a relationship of: $R_{DS_{Q4B}} = A*R_{DS_{Q4}}$, a capacitance of the fifth switch $C_{OSS_{Q3B}}$ and a capacitance of the third switch $C_{OSS_{Q3}}$ have a relationship of: $C_{OSS_{Q3}} = A*C_{OSS_{Q3B}}$, and a capacitance of the sixth switch $C_{OSS_{Q4B}}$ and a capacitance of the fourth switch $C_{OSS_{Q4}}$ have a relationship of: $C_{OSS_{Q4}} = A*C_{OSS_{Q4B}}$. In some embodiments, the second inductor is connected to the first inductor at a tap between ends of the first inductor, a ratio of a winding number of the first inductor that is tapped to by the second inductor to a total winding number of the first inductor is $n_T/n$, and an inductance of the second inductor $L_B$ and an inductance of the first inductor L have a relationship of $$L_B = \left(\frac{n_T}{n}\right)(A)L.$$

In some embodiments, the controller is configured to selectively turn on and off the third switch and the fifth switch at essentially the same time, and selectively turn on and off the fourth switch and the sixth switch at essentially the same time. In some embodiments, the controller is configured to sense a voltage across the fifth switch, determine times when the voltage across the fifth switch is substantially zero or satisfy a predetermined threshold level, and operate the third switch and the fifth switch to turn ON at the times when the voltage across the fifth switch is substantially zero or satisfies the predetermined threshold level for full or partial ZVS operation. In some embodiments, the controller is configured to sense a voltage across the sixth switch, determine times when the voltage across the sixth switch is substantially zero or satisfy a predetermined threshold level, and operate the fourth switch and the sixth switch to turn ON at the times when the voltage across the fourth switch is substantially zero or satisfies the predetermined threshold level for full or partial ZVS operation. In some embodiments, the controller is configured to sense a voltage across the fifth switch, determine times when the voltage across the fifth switch is substantially zero or satisfy a predetermined threshold level, and operate the third switch and the fifth switch to turn OFF at the times when the voltage across the fifth switch is substantially zero or satisfies the predetermined threshold level for full or partial ZCS operation. In some embodiments, the scaling factor is at least 10. In some embodiments, the scaling factor is at least 100. In some embodiments, the scaling factor is at least 1000.

In some embodiments, the method further includes selectively turning on and off the third switch and the fifth switch at essentially the same time, and selectively turn on and off the fourth switch and the sixth switch at essentially the same time. In some embodiments, the method further includes sensing a voltage across the fifth switch, determine times when the voltage across the fifth switch is substantially zero or satisfy a predefined threshold level for full or partial ZVS operation using sensed voltage across the fifth switch, and turning the third switch and the fifth switch ON at the times when the voltage across the fifth switch is substantially zero or satisfies the predetermined threshold level for full or partial ZVS operation. In some embodiments, the method further includes sensing a voltage across the fifth switch, determining times when the voltage across the fifth switch is substantially zero or satisfy a predefined threshold level for full or partial ZCS operation using the sensed voltage across the fifth switch, and turning the third switch and the fifth switch OFF at the times when the voltage across the fifth switch is substantially zero or satisfies the predetermined threshold level for full or partial ZCS operation. In some embodiments, the method further includes sensing a voltage across the sixth switch, determining times when the voltage across the sixth switch is substantially zero or satisfy a predefined threshold level for full or partial ZVS operation using the sensed voltage across the sixth switch, and turning the fourth switch and sixth switch ON at the times when the voltage across the sixth switch is substantially zero or satisfies the predetermined threshold level for full or partial ZVS operation. In some embodiments, the method further includes sensing a voltage across the resistor and using the sensed voltage and the scaling factor A to monitor the output current to the load.

The details of one or more embodiments of the invention are set forth in the accompanying drawings and description below. Other features, objects, and advantages of the invention will be apparent from the description and drawings, and from the claims.

DESCRIPTION OF THE DRAWINGS

These and other features, together with the organization and manner of operation thereof, will become apparent from the following detailed description when taken in conjunction with the accompanying drawings, wherein like elements have like numerals throughout the drawings.

DETAILED DESCRIPTION

For the purpose of promoting an understanding of the principles of the disclosure, reference will now be made to the embodiments illustrated in the drawings and specific language will be used to describe the same. It will nevertheless be understood that no limitation of the scope of the disclosure is thereby intended, any alternations and further modifications in the illustrated embodiments, and any further applications of the principles of the disclosure as illustrated therein as would normally occur to one skilled in the art to which the disclosure relates are contemplated herein. For example, a buck-boost switching power converter system is used as an example for demonstrating operation of the invention, however, other topologies, such as buck or boost converter topologies, may also be used.

Referring to the drawings generally, buck-boost switching power conversion systems and methods are disclosed herein. A buck-boost switching converter includes a main switching power circuit and a secondary switching power circuit. The main switching power circuit includes switches in an H-bridge configuration, in which a first leg of the H-bridge is connected to a DC power source and a second leg of the H-bridge is connected to a load. The first and second legs are connected through a first inductor that transfers power between the power source and the load. The secondary switching power circuit includes a third leg of switches and a resistor connected to the third leg. The secondary switching power circuit is connected to the main switching power circuit through a second inductor, which may be tapped to the first inductor. Switches on the third leg are turned on or off at essentially the same time as corresponding switches on the second leg. A current flowing through the second inductor scales down the current flowing through the first inductor (e.g., $\frac{1}{100}$). Voltages across switches on the third leg are sensed to control the timing of the switches in the second and third legs, e.g. for effecting ZVS and ZCS operation of the switches in the second and third legs.

Resolution and accuracy can be improved by using higher resistance switches in the third leg to produce larger voltages across the switches when ON which is made possible by much lower switch currents in the third leg and which is not practical in the second leg because of power dissipation and parasitic capacitances and inductances. Current flowing through the resistor, $R_S$, of the secondary power circuit is monitored by sensing the voltage across resistor $R_S$, which is a scaled representation of output current, i.e. the load current, of the main power circuit (e.g., a scale of $\frac{1}{100}$), thus power loss for monitoring the output current of the converter is reduced.

Figure 1:
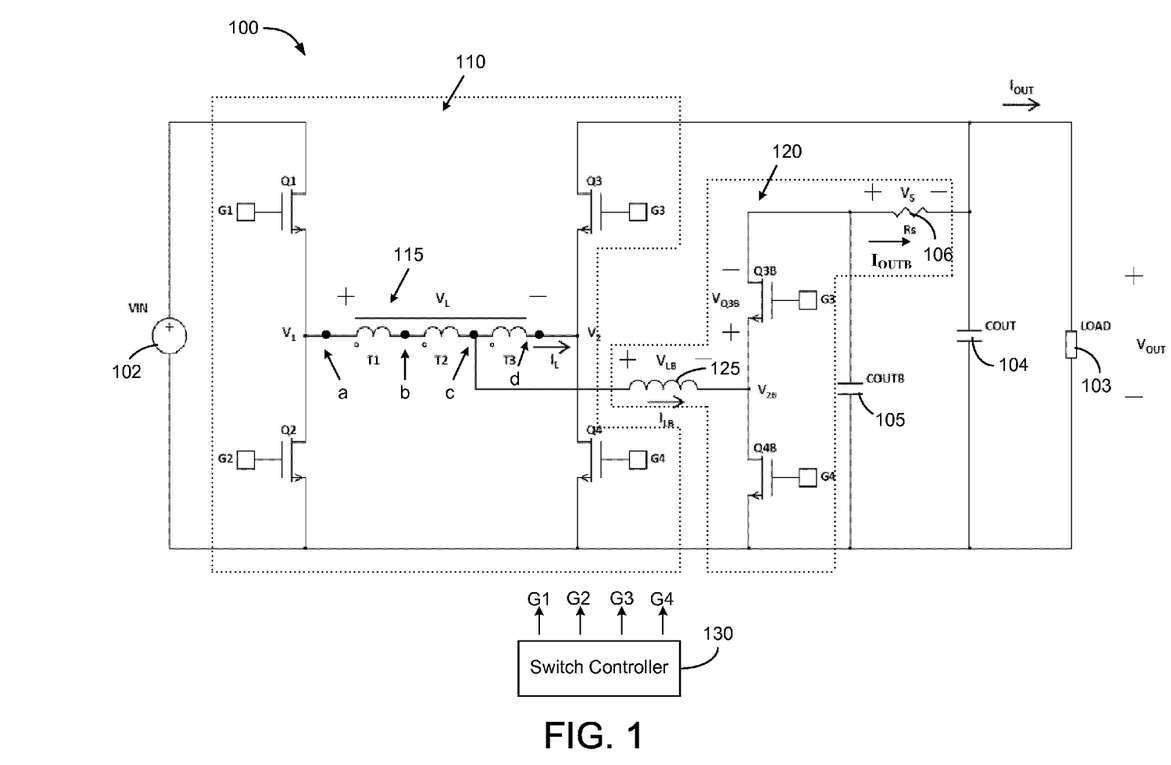
FIG. 1 shows an architecture for a buck-boost switching power conversion system according to an example embodiment.

Referring to FIG. 1, an architecture for a buck-boost switching power conversion system 100 is shown according to an example embodiment. The buck-boost conversion system 100 can be used in various electrical and electronic equipment and systems, for example, systems in which it is desirable that an output voltage remains substantially constant when an input voltage spans a range of values extending below and above the magnitude of the desired output voltage. As an example, the conversion system 100 can be used in power distribution systems designed to accommodate a wide range of input voltages reflecting various operating conditions. In particular, a typical telecommunications system may convert power from the alternating current (AC) mains down to a nominal 48 VDC distribution bus for supplying power to electronic equipment. A battery backup system may be connected to provide power to the 48 VDC bus in the event of a power failure or other interruption in power. As a result of many factors such as state of charge and load, the output voltage of the battery can vary over a large range (e.g., from 32 to 72 VDC) departing from the nominal 48 VDC. The conversion system 100 can accommodate such a wide range of voltages and deliver a substantially constant output voltage of the nominal 48 VDC. It should be understood that the telecommunications system is one example; the conversion system 100 can be used in various applications.

As shown in FIG. 1, the buck-boost switching power conversion system 100 comprises a main switching power circuit 110 (enclosed by dotted lines), a secondary switching power circuit 120 (enclosed by dotted lines), and a switch controller 130. The main switching power circuit 110 may have the same or similar structure as any switching power converter described in various patents and applications assigned to the Applicant VLT, Inc. A category of buck-boost switching power converters are described in Vinciarelli, Buck-Boost DC-DC Switching Power Conversion, U.S. Pat. No. 6,788,033 issued Sep. 7, 2004 (the "Buck-Boost Patent"); a variety of switching power converters, including buck, boost, and buck-boost converters, are described in Vinciarelli, Adaptive Control of Switching Losses in Power Converters, U.S. Pat. No. 8,669,744, issued Mar. 11, 2014 (the "Adaptive Patent"); Buck and boost converters are described in Prager et al, Loss and Noise Reduction in Power Converters, U.S. Pat. No. RE40,072, reissued Feb. 19, 2008 (the "Clamped Patent"). Each of the Buck-Boost Patent, Adaptive Patent, and Clamped Patent is assigned to VLT, Inc. and each is incorporated herein by reference in its entirety. Further, in some implementations, the main switching power circuit 110 may be controlled in a similar manner to that described in the Buck-Boost Patent and/or the other above-identified patents. For example, in some embodiments as described in further detail below, unique structural and/or functional features of the present disclosure may be utilized to perform the measurements used to control the main switching power circuit 110, and the measurements may then be used to control the components of the main switching power circuit 110 in a manner similar to that described in the aforementioned patents.

In some embodiments, the main switching power circuit 110 includes an H-bridge of two legs, with switches Q1 and Q2 on the first leg and switches Q3 and Q4 on the second leg. The first leg and the second leg are connected through a first inductor 115 connecting node $V_1$ between switches Q1 and Q2 on the first leg and node $V_2$ between switches Q3 and Q4 on the second leg. A power source 102 (e.g., a battery) is connected to the first leg and delivers an input voltage $V_{IN}$ to the conversion system 100. A load 103 is connected to the second leg. The first inductor 115 can transfer electrical power between the power source 102 and the load 103 when switches Q1, Q2, Q3, and Q4 are selectively turned on or off by the switch controller 130 following certain time sequence. The time sequence of turning switches on and off will be discussed below in more detail with reference to FIG. 2. Although switches Q1 through Q4 are shown to be MOSFETs, it should be understood that other controllable switching elements may be utilized to selectively enable the conduction of current. In some embodiments, an output voltage $V_{OUT}$ on the load 103 remains substantially constant while the input voltage $V_{IN}$ varies. A capacitor 104 with a capacitance of $C_{OUT}$ may be connected in parallel to the second leg for filtering the pulsating components in the output current $I_{OUT}$ flowing through the load 103.

The secondary power circuit 120 is structured to scale down a current flowing through the first inductor 115 of the main power circuit 110. In the illustrated embodiment, the secondary power circuit 120 comprises a second inductor 125, a third leg with switches Q3B and Q4B thereon, and a resistor 106 with a resistance of $R_S$. One end of the second inductor 125 is connected to node $V_{2B}$ between switches Q3B and Q4B on the third leg. The other end of the second inductor 125 is connected to the first inductor 115, thus driving a scaled portion of the current from the main power circuit 110 into the secondary power circuit 120. As shown in FIG. 1, the first inductor 115 includes three sections ab, bc, and cd. In some implementations, the second inductor 125 may be connected at node V1, or at an input of the first inductor 115. In some implementations, the first inductor 115 may be a tapped inductor having one or more taps provided in an interior of the first inductor 115 (i.e., taps provided on turns of the first inductor 115), such as at nodes b or c illustrated in FIG. 1. The second inductor 125 may be tapped to the first inductor 115 at point b, c, or any other point of the first inductor 115. In the illustrated embodiment, the second inductor 125 is tapped to the first inductor 115 at point c.

The second inductor 125 transfers electrical power from the power source 102 to the load 103 through the sense resistor, $R_S$, 106 when switches Q1, Q2, Q3B, and Q4B are selectively turned on or off by the switch controller 130 following certain time sequences. In some implementations, the time sequence for switches Q3B and Q4B used by the switch controller 130 is the same as the time sequence for switches Q3 and Q4 on the second leg, i.e., switches Q3B and Q3 are turned on or off substantially simultaneously, and switches Q4B and Q4 are turned on or off substantially simultaneously by the switch controller 130. As used herein, operation of the switches to turn ON or OFF "substantially simultaneously" or "at essentially the same time" refers to controlling the subject switches to transition at the same point in the phase of, and on the scale of, the operating cycle of the converter notwithstanding minor variations, e.g. due to propagation delays or control thresholds. Although switches Q3B and Q4B are shown to be MOSFETs, it should be understood that other controllable switching elements may be utilized to selectively enable the conduction of current. In some embodiments, a capacitor 105 with a capacitance of $C_{OUTB}$ may be connected in parallel to the third leg for filtering the pulsating components in the output current $I_{OUTB}$ flowing through the resistor 106.

The secondary switching power circuit 120 is structured to scale down a current $I_L$ flowing through the first inductor 115 to a current $I_{LB}$ flowing through the second inductor 125 by a scaling factor A. Similarly, a current $I_{OUT}$ flowing through the load 103 may be scaled down to a current $I_{OUTB}$ flowing through the resistor 106 by A. The scaling factor A may be, for example, 10, 50, 100, 200, 300, or any suitable value. The scaled down relationship can be expressed as follows:

$$I_{LB} = \frac{I_L}{A}, \text{ and} \tag{1}$$

$$I_{OUTB} = \frac{I_{OUT}}{A}. \tag{2}$$

In order to achieve the scaled down relationship of equation (1), the resistances of components of the main switching power circuit 110 and secondary switching power circuit 120 may be selected to have the following relationship, in some embodiments:

$$R_{DC_{LB}} = A * R_{DC_L} \tag{3},$$

where $R_{DC_{LB}}$ is the DC resistance of the second inductor 125, and $R_{DC_L}$ is the DC resistance of the first inductor 115;

$$R_{DS_{Q3B}} = A * R_{DS_{Q3}} \tag{4},$$

where $R_{DS_{Q3B}}$ is the drain to source resistance of the switch Q3B when turned on, and $R_{DS_{Q3}}$ is the drain to source resistance of the switch Q3 when turned on; and $$R_{DS_{Q4B}} = A * R_{DS_{Q4}} \tag{5},$$

where $R_{DS_{Q4B}}$ is the drain to source resistance of the switch Q4B when turned on and $R_{DS_{Q4}}$ is the drain to source resistance of the switch Q4 when turned on. In an example embodiment, $R_{DS_{Q3B}}$ (and $R_{DS_{Q4B}}$) is set to be 400 mΩ while $R_{DS_{Q3}}$ (and $R_{DS_{Q4}}$) is set to be 4 mΩ.

From the scaled down relationship of equation (1), the inductive current $I_{LB}$ that flows through switch devices Q3B and/or Q4B is 1/A of the inductive current $I_L$ that flows through switch devices Q3 and/or Q4. For switches Q3 and Q3B (as well as Q4 and Q4B) to achieve ZVS at the same time, the capacitances of components of the main power circuit 110 and secondary power circuit 120 can be selected as follows:

$$C_{OSS_{Q3}} = A * C_{OSS_{Q3B}} \tag{6},$$

where $C_{OSS_{Q3}}$ is the output capacitance (i.e., gate and source shorted) of the switch Q3, and $C_{OSS_{Q3B}}$ is the output capacitance of the switch Q3B;

$$C_{OSS_{Q4}} = A * C_{OSS_{Q4B}} \tag{7},$$

where $C_{OSS_{Q4}}$ is the output capacitance (i.e., gate and source shorted) of the switch Q4, and $C_{OSS_{Q4B}}$ is the output capacitance of the switch Q4B; and $$C_{OUT} = A * C_{OUTB} \tag{8},$$

where $C_{OUT}$ is the capacitance of the capacitor 104 connected in parallel with the second leg, and $C_{OUTB}$ is the capacitance of the capacitor 105 connected in parallel with the third leg.

In order to achieve the scale down relationship (1), the inductance $L_B$ of the second inductor 125 should be selected based on the inductance L of the first inductor 115. In the illustrated implementation in which the first inductor 115 is a tapped inductor and the second inductor 125 is connected to the first inductor 115 at a tap, the relationship between the voltages across the first inductor 115 and the second inductor 125 can be represented as follows:

$$V_{L_B} = \left(\frac{n_T}{n}\right) V_L, \tag{9}$$

where $V_{L_B}$ is the voltage across the second inductor 125, and $V_L$ is the voltage across the first inductor 115. $n_T/n$ is the ratio of the winding numbers of the section of the first inductor 115 that is tapped (i.e., the number of windings after the tap node) by the second inductor 125 to the total winding number of the first inductor 115. In FIG. 1, the first inductor 115 has three sections ab, bc, and cd each having the same winding numbers. The second inductor 125 is tapped to the first inductor 115 at point c, thus $n_T/n$ equals ⅓, which is the winding numbers of section cd to the sum of winding number of sections ab, bc, and cd. If the second inductor 125 is tapped to the first inductor 115 at point b, then $n_T/n$ equals ⅔. If the second inductor 125 is connected at point a, rather than tapped to an interior of the first inductor 115, then $n_T/n$ equals 1. The inductance $L_B$ of the second inductor 125 can be determined as follows:

$$L_B = V_{L_B}\left(\frac{dt}{dI_{L_B}}\right) = \left[\left(\frac{n_T}{n}\right)V_L\right]\left(\frac{Adt}{dI_L}\right) = \left(\frac{n_T}{n}\right)(A)L. \tag{10}$$

In an example embodiment, the scaling factor A=100, and the inductance of the first inductor 115 L=450 nH. According to equation (10), the inductance of the second inductor 125 is:

$$L_B = \left(\frac{n_T}{n}\right)(A)L = \left(\frac{1}{3}\right)(100)(450 \text{ } nH) = 15 \text{ } \mu H. \tag{10'}$$

According to equation (10), the inductance $L_B$ of the second inductor 125 is proportional to the ratio $n_T/n$. Among the possible coupling points a, b, and c, the inductance $L_B$ corresponding to point c is smaller than the inductance $L_B$ corresponding to point b to achieve the same scaling factor, which is smaller than $L_B$ corresponding to point a to achieve the same scaling factor. Therefore, although the second inductor 125 can be connected at any of the points a, b, and c, tapping at point c provides an advantage of requiring the smallest inductance to achieve the scaling factor among points a, b, and c. Smaller inductance can be provided using fewer windings, which can result in reduced DC resistance and inter-winding capacitance, a physically smaller package, and more flexibility in form factor. Other advantages of smaller inductance include reduction in both hysteretic and eddy current contributions to core loss, increased margin with respect to core saturation (helping ensure operations within linear regions), and so on.

The inductive current $I_L$ flowing through the first inductor 115 can be determined according to the following equation:

$$I_L = A\left(\frac{V_{Q3B}}{R_{DS_{Q3B}}}\right). \quad (11)$$

In equation (11), the scaling factor A and the drain to source resistance of the switch Q3B are known constants. Thus, the inductive current $I_L$ is substantially proportionally to the voltage $V_{Q3B}$ across the switch Q3B (when switch Q3B and Q3 are on), which can be sensed by the controller, for example, using a voltage comparator or amplifier. By monitoring the voltage $V_{Q3B}$ on the secondary power circuit 120 as a proxy for the inductive current $I_L$ to monitor the state of the converter, higher accuracy can be achieved because parasitic noise can be greatly reduced and more precise control of the switches for ZCS and ZVS operation can be attained by the controller. For example, sensing VQ3B when Q3 and Q3B are ON may be used for ZCS operation during turn OFF; and sensing VQ3B when Q3 and Q3B are OFF may be used for ZVS operation during turn ON. In both instances, high accuracy can be achieved because parasitic noise can be greatly reduced.

The average value of the output current $I_{OUT}$ flowing through the load 103 can be determined according to the following equation:

$$I_{OUT_{avg}} = AI_{OUTB_{avg}} = A\left(\frac{V_{S_{avg}}}{R_s}\right), \quad (12)$$

wherein $V_{S_{avg}}$ is the average voltage across the resistor 106. In equation (12), the scaling factor A and the resistance $R_s$ of the resistor 106 are known constants. The average voltage $V_{S_{avg}}$ can be measured by, for example, a voltage sensor, and thus $I_{OUT_{avg}}$ can be determined according to equation (12). By measuring the average voltage $V_{S_{avg}}$ across the resistor 106 on the secondary power circuit 120 rather than a resistor on the main power circuit, power loss can be greatly reduced because the current flowing through the resistor 106 is only 1/A (e.g., 1/100) of the current flowing through a resistor on the main power circuit. While the illustrative implementations described above calculate $I_{OUT_{avg}}$ and $I_L$ using measured voltages, it should be appreciated that, in some embodiments, current sensors could additionally or alternatively be used to measure currents flowing through resistor 106 and switch Q3B, and such current measurements could be used with the scaling factor A to determine $I_{OUT_{avg}}$ and $I_L$ without departing from the scope of the present disclosure.

Still referring to FIG. 1, the switch controller 130 is configured to selectively turn on or off switches Q1, Q2, Q3, and Q4 on the main power circuit 110 as well as switches Q3B and Q4B on the secondary power circuit 120 so that the first inductor 115 can transfer electrical power between the power source 102 and the load 103 and the second inductor 125 can transfer electrical power from the power source 102 to the load 103 through the sense resistor, $R_S$, 106. As shown in FIG. 1, the switch controller 130 outputs signals to control each gate of the switches, which are MOSFETs. It should be understood that other controllable switching elements may also be used. The time sequence for switches Q3B and Q4B is the same as time sequence for switches Q3 and Q4, in some implementations. In other words, switches Q3B and Q3 may be turned on or off simultaneously, and switches Q4B and Q4 may be turned on or off simultaneously, as follows:

$$t_{onQ3} = t_{onQ3B}$$

$$t_{onQ4} = t_{onQ4B} \quad (13).$$

Processes or logic used by the switch controller 130 for controlling switches Q1 through Q4 in the main switching power circuit and switches Q3B and Q4B in the secondary switching power circuit can include any process or logic disclosed in the above mentioned Buck-Boost Patent, Adaptive Patent, and Clamped Patent, in various embodiments.

In some embodiments, the switch controller 130 selectively turns on or off the switches in a series of converter operating cycles. The operating cycles may share a common sequence of switching phases, irrespective of the input voltage $V_{IN}$ being above, below, or approximately the same as the output voltage, $V_{OUT}$. The switch controller 130 controls the duration of each switching phase based on the input voltage $V_{IN}$, the output voltage $V_{OUT}$, and the load with, for example, adaptive algorithms.

Figure 2:
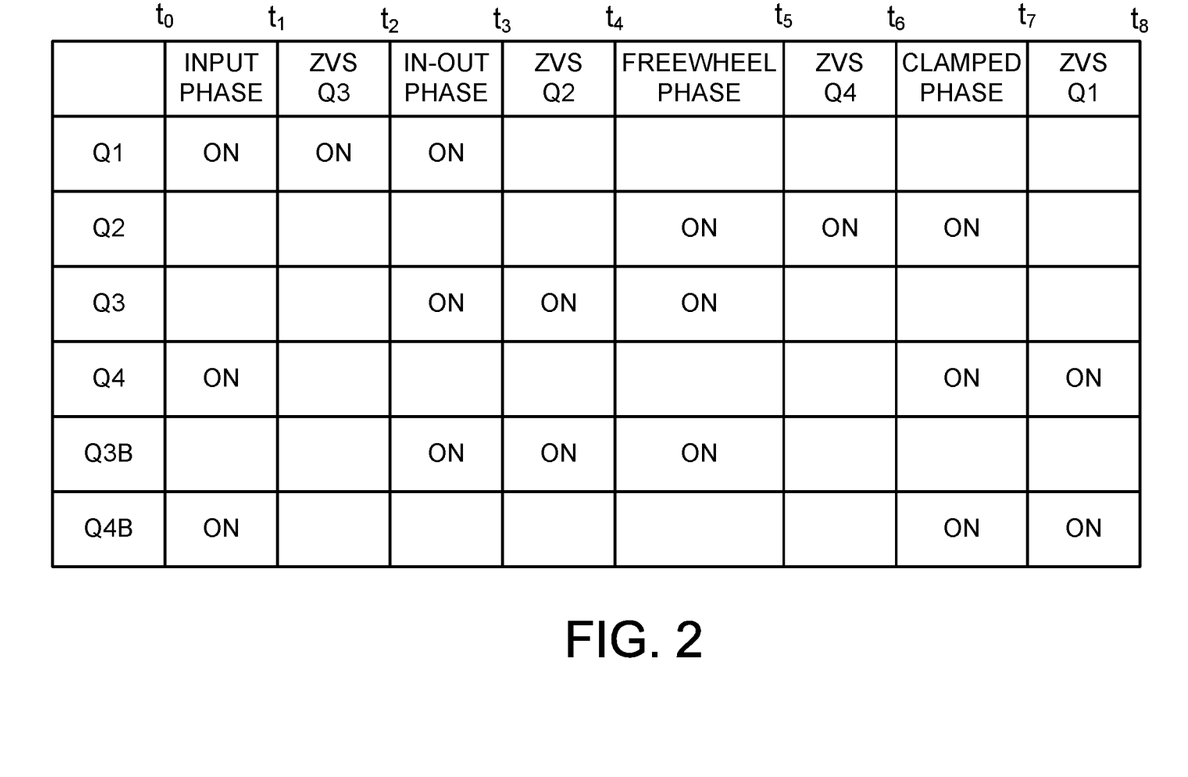
FIG. 2 shows a switch timing sequence and operating phases for the buck-boost switching power conversion system of FIG. 1, according to an example embodiment.

Referring to FIG. 2, a switch timing sequence and operating phases of one operating cycle for the secondary buck-boost switching power conversion system 100 of FIG. 1 are shown, according to an example embodiment. The switch controller 130 operates the switches Q1, Q2, Q3, Q4, Q3B, and Q4B according to the control logic shown in FIG. 2. In some embodiments, each converter operating cycle comprises eight phases described in the column heading in FIG. 2. The sequence repeats in steady state operations. In FIG. 2, a blank table entry means that a switch is OFF. For example, switch Q1 is ON during the "Input Phase," the "ZVS-Q3 Phase," and the "In-Out Phase" and is OFF during the rest of the phases. Operations in a boost mode (i.e., $V_{IN} < V_{OUT}$) or buck mode (i.e., $V_{IN} > V_{OUT}$) do not require a change in the control logic sequence. Rather, the relative and absolute durations of each of the phases determine whether the converter operates in the boost mode or buck mode. Thus, a converter can be arranged to generate a constant output voltage, $V_{OUT}$, as its input voltage, $V_{IN}$, varies over a range of values which extends above and below the value of $V_{OUT}$ without changing the control logic used for sequencing the switches.

In order to establish a polarity convention applicable to both positive and negative ground converters, a positive polarity of inductive current $I_L$ flowing through the first inductor 115 is defined herein as being in a direction that would transfer energy to the load 103 and a negative polarity of inductive current $I_L$ as being in a direction that would transfer energy to the input power source 102. Similarly, a positive polarity of inductive current $I_{LB}$ flowing through the second inductor 125 is defined as being in a direction that would transfer energy through the sense resistor 106 to the load 103 and a negative polarity of inductive current $I_{LB}$ as being in a direction that would transfer energy to the input power source 102. Prior to time $t_0$, switches Q4 and Q4B are on, switches Q1, Q2, Q3, and Q3B are off, the inductive currents $I_L$ and $I_{LB}$ each have a negative magnitude; the voltage across switch Q2 has risen to equal the magnitude of the input voltage $V_{IN}$; and the voltages across switches Q4 and Q4B are close to zero (0) volts, owing to the switches being on.

At time $t_0$, the switch controller 130 turns switch Q1 on and the "Input Phase" begins. During the input phase, switches Q1, Q4, and Q4B are on so that the power source 102 is connected across the first inductor 115 and the second inductor 125. Thus inductive currents $I_L$ and $I_{LB}$ ramp up. In some embodiments, the switch controller 130 may implement a control strategy for adjusting the duration of the "Input Phase" and the amount of energy stored in the inductor at the end of the "Input Phase," as a function of energy required to ensure ZVS of switches Q2, Q3, and Q3B, which is called adaptive input-phase control.

At time $t_1$, the switch controller 130 turns switches Q4 and Q4B off. Between times $t_1$ and $t_2$ (i.e., the "ZVS-Q3 Phase"), only switch Q1 is on and the voltage at node $V_1$ between switches Q1 and Q2 remains equal to $V_{IN}$. With switches Q3 and Q4 both off and switches Q3B and Q4B both off during the ZVS-Q3 phase, the inductive currents $I_L$ would charge and discharge the parasitic capacitances of switches Q4 and Q3 and the inductive current $I_{LB}$ would charge and discharge the parasitic capacitances of switches Q4B and Q3B. Thus voltage at node $V_2$ between switches Q3 and Q4 and voltage at node $V_{2B}$ between switches Q3B and Q4B would change (i.e., rise or fall), essentially without loss, toward the value of the output voltage $V_{OUT}$. If duration of the ZVS-Q3 phase is sufficiently long, the voltage across switch Q3 and the voltage across switch Q3B can be brought to essentially zero (0) volts so that switches Q3 and Q3B can be turned on essentially without loss. However, a ZVS-Q3 phase of any duration will result in a reduction in the voltages across Q3 and Q3B, thereby providing a beneficial reduction in the switching loss associated with the discharge of parasitic capacitances when switches Q3 and Q3B are turned on. As discussed above, ZVS is an approach to reduce the switching loss in the converter, which uses an inductive current to charge and discharge the capacitance associated with the switch before turning the switch on.

At time $t_2$, the switch controller 130 turns switches Q3 and Q3B on initiating the In-Out Phase between times $t_2$ and $t_3$, during which switches Q1, Q3, and Q3B are ON and the voltage $V_L$ impressed across the first inductor 115 is equal to $V_{IN}$-$V_{OUT}$.

At time $t_3$, the switch controller 130 turns switch Q1 off. Between times $t_3$ and $t_4$ (i.e., the "ZVS-Q2 Phase"), the inductive currents $I_L$ (and the inductive currents $I_{LB}$, which scales down $I_L$) would charge and discharge the parasitic capacitances of switches Q1 and Q2 and the voltage at node $V_1$ will change towards zero (0) volts, essentially without loss. If duration of the ZVS-Q2 phase is sufficiently long, the voltage across switch Q2 can be brought to essentially zero (0) volt and switch Q2 can be turned on essentially without loss. However, a ZVS-Q2 Phase of any duration would result in a reduction in the voltage across switch Q2 thereby providing a beneficial reduction in the switching loss associated with the discharge of parasitic capacitances when switch Q2 is turned on.

At time $t_4$, the switch controller 130 turns switch Q2 on. Between times $t_4$ and $t_5$ (i.e., the "Freewheel Phase"), switches Q2, Q3, and Q3B are on and the output voltage $V_{OUT}$ is impressed across the first inductor 115, i.e., $V_L$= $-V_{OUT}$ causing the inductor current $I_L$ to ramp down. Inductor 125 also has a negative voltage impressed across it causing inductor current $I_{LB}$ to similarly ramp down.

Time $t_5$ is determined by the zero crossing of the inductor current for ZCS operation of Q3 and Q3B. By sensing when the voltage across switch Q3B comes within a threshold voltage of zero (e.g. +0.4>$V_{Q3B}$>−0.6 V), the switch controller 130 may turn switches Q3 and Q3B off at essentially zero current for ZCS operation. By turning off Q3 and Q3B at or near zero current (e.g., no more than ±10% of full load current), the losses associated with turn off are reduced. The current is typically monitored by measuring the voltage across the RDSon of Q3. However, with on-resistances improving faster than packaging technology, this voltage signal is increasingly corrupted by parasitic inductances. The secondary circuit facilitates ZCS by measurement of the voltage across Q3B, which carries the scaled down current and possesses greater on-resistance, effectively negating the noise created by parasitic package inductance. Between times $t_5$ and $t_6$ (i.e., the "ZVS-Q4 Phase"), only switch Q2 is on and the voltage at node $V_1$ remains equal to zero (0). With switches Q3 and Q4 both off during the ZVS-Q4 Phase, the negative flow of the inductive current $I_L$ would charge and discharge the parasitic capacitances of switches Q3 and Q4 and the voltage at node $V_2$ would change towards zero (0) volts, essentially without loss. Similarly, with switches Q3B and Q4B both off during the ZVS-Q4 Phase, the negative flow of the inductive current $I_{LB}$ would charge and discharge the parasitic capacitances of switches Q3B and Q4B and the voltage at node $V_{2B}$ would change towards zero (0) volts, essentially without loss. If duration of the ZVS-Q4 Phase is sufficiently long, voltages across switches Q4 and Q4B can be brought to essentially zero (0) volt and switches Q4 and Q4B can be turned on essentially without loss. However, a ZVS-Q4 Phase of any duration would result in a reduction in voltages across switches Q4 and Q4B, thereby providing a beneficial reduction in the switching loss associated with the discharge of parasitic capacitances when switches Q4 and Q4B are turned on.

At time $t_6$, the switch controller 130 turns switches Q4 and Q4B on. Between times $t_6$ and $t_7$ (i.e., the "Clamped Phase"), switches Q2, Q4, and Q4B are on, the voltage $V_L$ across the first inductor 115 is essentially zero (0) and the inductive current $I_L$ remains essentially constant assuming low DC losses in inductor 115 and switches Q2 and Q4. Similarly, the voltage $V_{LB}$ across the second inductor 125 is essentially zero (0) and the inductive current $I_{LB}$ remains essentially constant assuming low DC losses in inductor 125 and switches Q2 and Q4B. During the "Clamped Phase," energy, associated with a flow of negative current in the inductors 115 and 125, is trapped in the inductors by closing switches Q2, Q4, and Q4B across the inductors. As a result, undesirable oscillations can be prevented and much lower loss can be achieved in comparison to losses in conventional resistive dampers or "anti-ring" resistors. The energy retained within the inductors 115 and 125 by inductive currents $I_L$ and $I_{LB}$ while the inductors are "clamped" to essentially zero (0) voltage may be used to reduce the switching loss in the following transition. In some embodiments, the "Clamped Phase" may be omitted or more preferably shortened to a minimal duration without changing the time sequences of the control logic implemented by the switch controller 130.

At time $t_7$, the switch controller 130 turns switch Q2 off. Between times $t_7$ and $t_8$ (i.e., the "ZVS-Q1 Phase"), only switches Q4 and Q4B are on and the voltages at node $V_2$ and $V_{2B}$ remain essentially equal to zero (0). The actual voltage at those nodes $V_2$ and $V_{2B}$ can be calculated by the following:

$$V_2 = (-I_L) \times R_{DSonQ4}$$

$$V_{2B} = (-I_{LB}) \times R_{DSonQ4B}$$

In a typical converter the voltage $V_2$, $V_{2B}$ may fall between 0V and −0.8V. With switches Q1 and Q2 both off during the ZVS-Q1 Phase, the inductive currents $I_L$ (and the inductive currents $I_{LB}$, which scales down $I_L$) would charge and discharge the parasitic capacitances of switches Q1 and Q2 and the voltage at node $V_1$ will change towards $V_{IN}$, essentially without loss. If the ZVS-Q1 Phase is sufficiently long and enough energy was stored in inductors 115 and 125 from the prior cycle, the voltage across switch Q1 would be brought to essentially zero (0) volts and switch Q1 can be turned on essentially without loss. However, a ZVS-Q1 Phase of any duration would result in a reduction in the voltage across switch Q1, thereby providing a beneficial reduction in the switching loss associated with the discharge of parasitic capacitances when switch Q1 is turned on. Full ZVS operation as used herein refers to at least 90% reduction in the voltage across the switch prior to turn ON. Partial ZVS operation as used herein refers to a partial reduction, e.g. at least 50% but less than 90%, in the voltage across a switch prior to turn ON. Full ZCS operation as used herein refers to at least 90% reduction in the current through the switch prior to turn ON. Partial ZCS operation as used herein refers to a partial reduction, e.g. at least 50% but less than 90%, in the current through a switch prior to turn ON.

At time $t_8$, the switch controller 130 turns switch Q1 on, beginning another converter operating cycle. Within each cycle in a succession of cycles, the inductive currents $I_L$ and $I_{LB}$ may flow bi-directionally between the power source 102 and the load 103 (through the sense resistor 106 in the case of $I_{LB}$) to enable the switch controller 130 to operate switches at full or partial ZVS and/or full or partial ZCS to reduce switching losses and noise.

Figure 3:
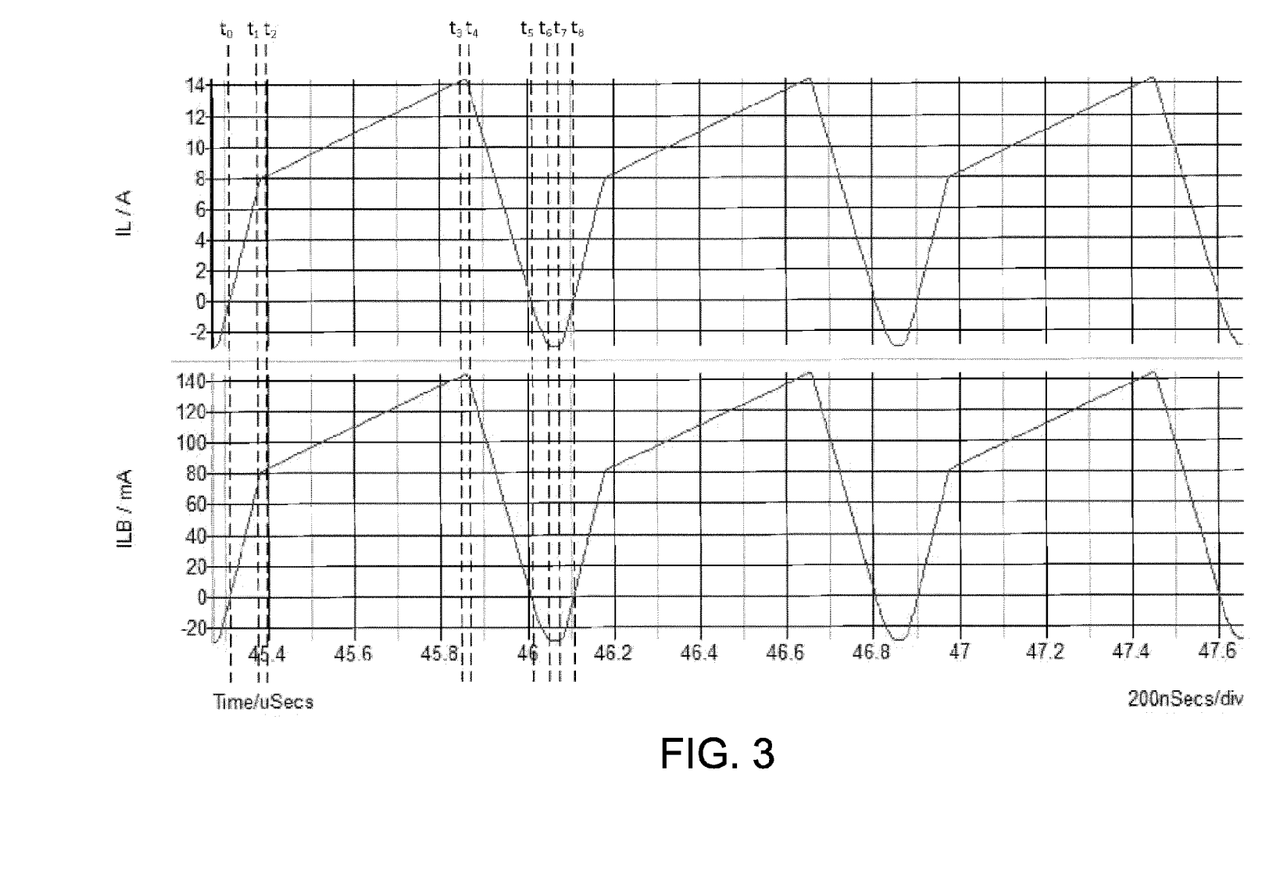
FIG. 3 shows a simulated result of currents flowing through inductors in the buck-boost switching power conversion system of FIG. 1, according to an example embodiment.

Referring to FIG. 3, a simulated result of inductive currents $I_L$ and $I_{LB}$ flowing through the first inductor 115 and the second inductor 125 in the secondary buck-boost switching power conversion system 100 of FIG. 1 is shown, according to an example embodiment. In the waveforms shown in FIG. 3, the "Clamped Phase" is shown having a minimal duration which is preferred over elimination which would require a change in the sequence of the operation of the switches.

In this example embodiment, the input voltage of the power source 102 is $V_{IN}$=55 V, and the nominal output voltage is $V_{OUT}$=48 V. The inductance of the first inductor is L=495 nH. The drain to source resistance of the switch Q3B is $R_{DS_{Q3B}}$=400 mΩ. The resistance of the resistor 106 is $R_S$=1Ω. The second inductor 125 is tapped to the first inductor 115 at point c, i.e., $$\frac{n_T}{n} = \frac{1}{3}.$$

To achieve a scaling factor of A=100, the inductance of the second inductor 125 can be determined based on equation (10) as follows:

$$L_B = \left(\frac{n_T}{n}\right) A * L = 16.5 \ \mu H$$

The peak inductive current $I_{L_{peak}}$ flowing through the first inductor 115 can be determined based on equation (11) as follows:

$$I_{L_{Peak}} = A\left(\frac{V_{Q3B_{Peak}}}{R_{DS_{Q3B}}}\right) = 100\left(\frac{57.2 \text{ mV}}{400 \text{ m}\Omega}\right) = 14.3 \ A,$$

wherein $V_{Q3B_{peak}}$ is the voltage across the switch Q3B measured at the peak current.

The average output current $I_{OUT_{avg}}$ can be determined based on equation (12) as follows:

$$I_{OUT_{avg}} = A\left(\frac{V_{S_{avg}}}{R_s}\right) = 100\left(\frac{80 \text{ mV}}{1 \ \Omega}\right) = 8 \ A$$

Simulated results in FIG. 3 show that the secondary buck-boost converter with the above parameters can achieve inductive currents $I_L$ and $I_{LB}$ as desired.

Figure 4:
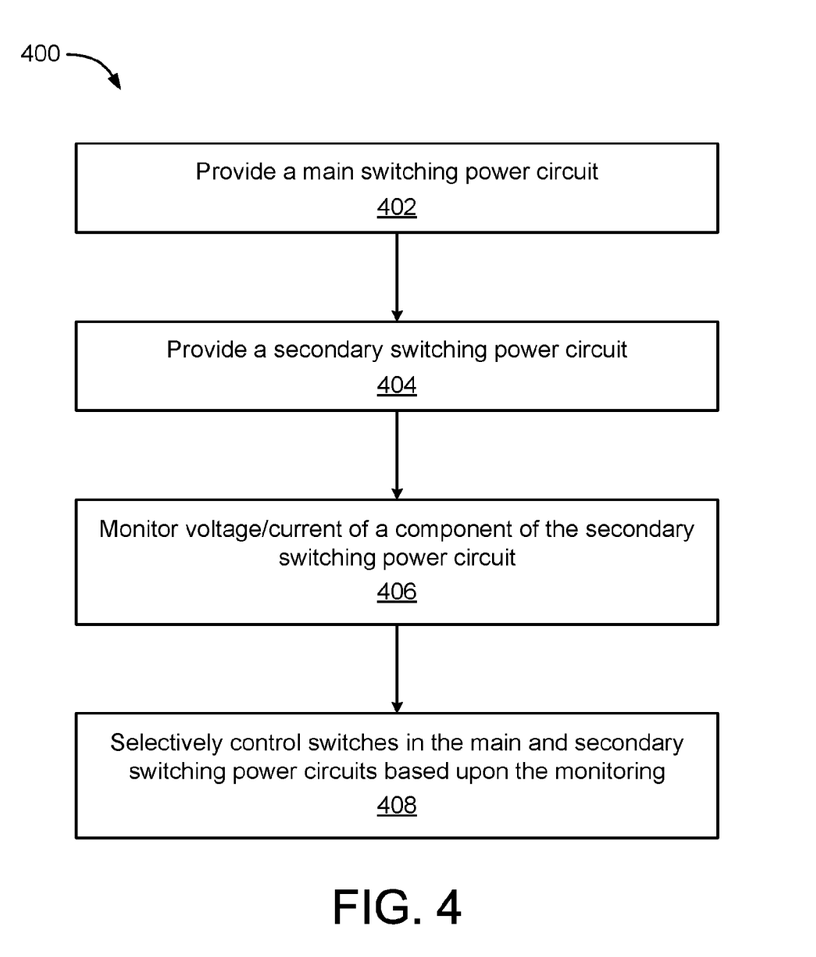
FIG. 4 shows a flow diagram of a method for converting power, according to an example embodiment.

Referring to FIG. 4, a flow diagram of a method 400 for converting power is shown, according to an example embodiment. At an operation 402, a main switching power circuit is provided for converting power from a power source at an input voltage to an output voltage supplying a load. The main switching power circuit may have the same or similar structure as main switching power circuit 110 shown in FIG. 1. In particular, the main switching power circuit includes a first leg connected to the power source including a first switch and a second switch, a second leg connected to the load and including a third switch and a fourth switch, and a first inductor connecting a first node between the first switch and the second switch to a second node between the third switch and the fourth switch. During operation, a first inductive current flows through the first inductor to transfer power between the power source and the load.

At an operation 404, a secondary switching power circuit is provided for scaling the first inductive current flowing through the first inductor to a second inductive current smaller than the first inductive current by a scaling factor A. The secondary switching power circuit may have the same or similar structure as secondary switching power circuit 120 shown in FIG. 1. In particular, the secondary switching power circuit includes a third leg and a second inductor. The third leg includes a fifth switch, a sixth switch, and a sense resistor. The second inductor is connected to the first inductor. During operation, the second inductive current flows through the second inductor.

For the second inductive current to scale down the first inductive current by the scaling factor A, parameters of components of the main and secondary power circuit satisfy a certain relationship. In some embodiments, a DC resistance of the second inductor $R_{DC_{LB}}$ and a DC resistance of the first inductor $R_{DC_L}$ have a relationship of: $R_{DC_{LB}} = A * R_{DC_L}$; a drain to source resistance of the fifth switch $R_{DS_{Q3B}}$ and a drain to source resistance of the third switch have a relationship of: $R_{DS_{Q3B}} = A*R_{DS_{Q3}}$, a drain to source resistance of the sixth switch $R_{DS_{Q4B}}$ and a drain to source resistance of the fourth switch have a relationship of: $R_{DS_{Q4B}} = A*R_{DS_{Q4}}$, a capacitance of the fifth switch $C_{OSS_{Q3B}}$ and a capacitance of the third switch $C_{OSS_{Q3}}$ have a relationship of: $C_{OSS_{Q3}} = A*C_{OSS_{Q3B}}$, and a capacitance of the sixth switch $C_{OSS_{Q4B}}$ and a capacitance of the fourth switch $C_{OSS_{Q4}}$ have a relationship of: $C_{OSS_{Q4}} = A*C_{OSS_{Q4B}}$.

In some embodiments, the second inductor is connected to the first inductor at a tap between ends of the first inductor, a ratio of a winding number of the first inductor that is tapped to by the second inductor to a total winding number of the first inductor is $n_T/n$, and wherein an inductance of the second inductor $L_B$ and an inductance of the first inductor L have a relationship of $$L_B = \left(\frac{n_T}{n}\right)(A)L.$$

At an operation 406, at least one of a voltage across or a current through a component of the secondary buck-boost power circuit is sensed. In some embodiments, a voltage across the fifth switch may be sensed, and determined to be substantially zero. In some embodiments, a voltage across a resistor of known value is sensed as a proxy for the output current to the load using the scaling factor A. In some embodiments, current flowing through the fifth switch or the resistor may be additionally or alternatively sensed to detect zero current in the switch for ZCS operation of the third and fifth switches, and/or used with the scaling factor A to sense the output current.

At an operation 408, the timing and operation of the main power circuit and secondary power circuit are controlled, e.g. the first switch, second switch, third switch, fourth switch, fifth switch, and sixth switch are selectively turned on or off, in response to the sensed voltages or current. In some embodiments, the third switch and the fifth switch are selectively turned ON and OFF at the same time, and the fourth switch and the sixth switch are selectively turned ON and OFF at the same time. In some embodiments, the third switch and the fifth switch are turned ON for full or partial ZVS operation in response to determining the voltage across the fifth switch is substantially zero or below a threshold. In some embodiments, the fourth switch and the sixth switch are turned ON for full or partial ZVS operation in response to determining the voltage across the sixth switch is substantially zero or below a threshold. In some embodiments, the third switch and the firth switch are turned OFF for full or partial ZCS operation in response to determining the voltage across or the current through the fifth switch is substantially zero or below a threshold.

The disclosure is described above with reference to drawings. These drawings illustrate certain details of specific embodiments that implement the systems, apparatus, and/or methods of the present disclosure. However, describing the disclosure with drawings should not be construed as imposing on the disclosure any limitations that may be present in the drawings. No claim element herein is to be construed as a "means plus function" element unless the element is expressly recited using the phrase "means for." Furthermore, no element, component or method step in the present disclosure is intended to be dedicated to the public, regardless of whether the element, component or method step is explicitly recited in the claims.

It should be noted that although the disclosure provided herein may describe a specific order of method steps, it is understood that the order of these steps may differ from what is described. Also, two or more steps may be performed concurrently or with partial concurrence. It is understood that all such variations are within the scope of the disclosure.

The foregoing description of embodiments of the disclosure have been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principles of the disclosure and its practical application to enable one skilled in the art to utilize the disclosure in various embodiments and with various modifications as are suited to the particular use contemplated.

What is claimed is:

1. A switching power conversion system comprising:
    a main switching power circuit structured to convert power received via an input from a power source at an input voltage for delivery via an output at an output voltage to a load, the main switching power circuit comprising a first inductor, the main switching power circuit structured to have a first inductive current flowing through the first inductor during operation;
    a secondary switching power circuit structured to scale the first inductive current to a second inductive current smaller than the first inductive current by a scaling factor; and
    a controller configured to control selected operations of the main switching power circuit and the secondary switching power circuit by sensing circuit conditions in portions of the secondary switching power circuit.

2. The system of claim 1, wherein the main switching power circuit includes:
    a first leg configured to receive power from the power source and including a first switch and a second switch;
    a second leg connected to deliver power to the load including a third switch and a fourth switch; and
    the first inductor connecting a first node between the first switch and the second switch and a second node between the third switch and the fourth switch, the first inductive current flowing through the first inductor.

3. The system of claim 2, wherein the secondary switching power circuit includes:
    a third leg including a fifth switch and a sixth switch; and
    a second inductor connected to the first inductor, the second inductive current flowing through the second inductor during operation.

4. The system of claim 3, wherein the second inductor is connected to the first inductor at a tap between ends of the first inductor.

5. The system of claim 3, wherein the third leg is coupled to the output.

6. The system of claim 3, wherein the controller is configured to selectively turn on and off the third switch and the fifth switch at essentially the same time, and selectively turn on and off the fourth switch and the sixth switch at essentially the same time.

7. The system of claim 3, wherein the controller is configured to sense a voltage across the fifth switch;
    determine times when the voltage across the fifth switch is substantially zero or satisfy a predetermined threshold level; and
    operate the third switch and the fifth switch to turn ON at the times when the voltage across the fifth switch is substantially zero or satisfies the predetermined threshold level for full or partial ZVS operation.

8. The system of claim 3, wherein the controller is configured to sense a voltage across the sixth switch;
determine times when the voltage across the sixth switch is substantially zero or satisfies a predetermined threshold level; and
operate the fourth switch and the sixth switch to turn ON at the times when the voltage across the sixth switch is substantially zero or satisfies the predetermined threshold level for full or partial ZVS operation.

9. The system of claim 3, wherein the controller is configured to sense a voltage across the fifth switch;
determine times when the voltage across the fifth switch is substantially zero or satisfy a predetermined threshold level; and
operate the third switch and the fifth switch to turn OFF at the times when the voltage across the fifth switch is substantially zero or satisfies the predetermined threshold level for full or partial ZCS operation.

10. The system of claim 3, wherein the controller is configured to sense a current flowing in the third leg to sense current delivered to the output of the switching power conversion system.

11. The system of claim 10, wherein the controller is configured to sense a voltage across a resistor in the third leg to sense the current flowing in the third leg.

12. The system of claim 1, wherein the scaling factor is at least 10.

13. The system of claim 12, wherein the scaling factor is at least 100.

14. The system of claim 13, wherein the scaling factor is less than 1000.

15. The system of claim 3, wherein the main switching power circuit and the secondary switching power circuit each comprise a buck-boost topology.

16. A switching power conversion system for converting power received via an input from a power source at an input voltage for delivery at an output voltage for supplying a load, the switching power conversion system comprising:
a main switching power circuit including:
a first leg connected to the input to receive power from the power source and including a first switch and a second switch;
a second leg connected to the output to deliver power to the load and including a third switch and a fourth switch; and
a first inductor connecting a first node between the first switch and the second switch to a second node between the third switch and the fourth switch for carrying a first inductive current flowing through the first inductor during operation to convert power from the input to the output;
a secondary switching power circuit comprising:
a third leg including a fifth switch and a sixth switch; and
a second inductor having a first end connected to the first inductor and a second end connected to the third leg adapted to carry a second inductive current flowing through the second inductor during operation, the second inductive current being smaller than the first inductive current by a scaling factor A; and
a controller configured to monitor circuit conditions in the secondary switching power circuit and selectively control switches in the main and secondary switching power circuits based upon the monitoring.

17. The system of claim 16, wherein a DC resistance of the second inductor $R_{DC_{LB}}$ and a DC resistance of the first inductor $R_{DC_L}$ have a relationship of: $R_{DC_{LB}}=A*R_{DC_L}$, a drain to source resistance of the fifth switch $R_{DS_{Q3B}}$ and a drain to source resistance of the third switch have a relationship of: $R_{DS_{Q3B}}=A*R_{DS_{Q3}}$, a drain to source resistance of the sixth switch $R_{DS_{Q4B}}$ and a drain to source resistance of the fourth switch have a relationship of: $R_{DS_{Q4B}}=A*R_{DS_{Q4}}$, a capacitance of the fifth switch $C_{OSS_{Q3B}}$ and a capacitance of the third switch $C_{OSS_{Q3}}$ have a relationship of: $C_{OSS_{Q3}}=A*C_{OSS_{Q3B}}$, and a capacitance of the sixth switch $C_{OSS_{Q4B}}$ and a capacitance of the fourth switch $C_{OSS_{Q4}}$ have a relationship of: $C_{OSS_{Q4}}=A*C_{OSS_{Q4B}}$.

18. The system of claim 16, wherein the second inductor is connected to the first inductor at a tap between ends of the first inductor, a ratio of a winding number of the first inductor that is tapped to by the second inductor to a total winding number of the first inductor is $n_T/n$, and an inductance of the second inductor $L_B$ and an inductance of the first inductor L have a relationship of $$L_B = \left(\frac{n_T}{n}\right)(A)L.$$

19. The system of claim 16, wherein the controller is configured to selectively turn on and off the third switch and the fifth switch at essentially the same time, and selectively turn on and off the fourth switch and the sixth switch at essentially the same time.

20. The system of claim 16, wherein the controller is configured to sense a voltage across the fifth switch;
determine times when the voltage across the fifth switch is substantially zero or satisfy a predetermined threshold level; and
operate the third switch and the fifth switch to turn ON at the times when the voltage across the fifth switch is substantially zero or satisfies the predetermined threshold level for full or partial ZVS operation.

21. The system of claim 16, wherein the controller is configured to sense a voltage across the sixth switch;
determine times when the voltage across the sixth switch is substantially zero or satisfies a predetermined threshold level; and
operate the fourth switch and the sixth switch to turn ON at the times when the voltage across the sixth switch is substantially zero or satisfies the predetermined threshold level for full or partial ZVS operation.

22. The system of claim 16, wherein the controller is configured to sense a voltage across the fifth switch;
determine times when the voltage across the fifth switch is substantially zero or satisfy a predetermined threshold level; and
operate the third switch and the fifth switch to turn OFF at the times when the voltage across the fifth switch is substantially zero or satisfies the predetermined threshold level for full or partial ZCS operation.

23. The system of claim 16, wherein the controller is configured to sense a current flowing in the third leg to sense current delivered to the output of the switching power conversion system.

24. A method for converting power, the method comprising:
providing a main switching power circuit for converting power from a power source at an input voltage to an output voltage supplying a load, the main switching power circuit comprising:
a first leg connected to receive power from a power source including a first switch and a second switch;
a second leg connected to the load and including a third switch and a fourth switch; and
a first inductor connecting a first node between the first switch and the second switch to a second node between the third switch and the fourth switch, a first inductive current flowing through the first inductor during operation to transfer power between the power source and the load;

providing a secondary switching power circuit for scaling the first inductive current to a second inductive current smaller than the first inductive current by a scaling factor A, the secondary power circuit comprising:
a third leg including a fifth switch and a sixth switch; and
a second inductor connected to the first inductor, the second inductive current flowing through the second inductor during operation;

monitoring at least one of a voltage across or a current through a component of the secondary switching power circuit; and selectively controlling switches in the main and secondary switching power circuits based upon the monitoring.

25. The method of claim 24, selectively turning on and off the third switch, fourth switch, fifth switch, and sixth switch comprising:
selectively turning on and off the third switch and the fifth switch at essentially the same time, and
selectively turning on and off the fourth switch and the sixth switch at essentially the same time.

26. The method of claim 24, monitoring at least one of the voltage across or the current through a component of the secondary switching power circuit comprising:
sensing a voltage across the fifth switch; and
determining times when the voltage across the fifth switch is substantially zero or satisfy a predefined threshold level for full or partial ZVS operation using the sensed voltage across the fifth switch.

27. The method of claim 26, selectively controlling switches comprising turning the third switch and the fifth switch ON at the times when the voltage across the fifth switch is substantially zero or satisfies the predetermined threshold level for full or partial ZVS operation.

28. The method of claim 26, selectively controlling switches comprising turning the third switch and the fifth switch OFF at the times when the voltage across the fifth switch is substantially zero or satisfies the predetermined threshold level for full or partial ZCS operation.

29. The method of claim 24, monitoring at least one of the voltage across or the current through a component of the secondary switching power circuit comprising:
sensing a voltage across the sixth switch; and
determining times when the voltage across the sixth switch is substantially zero or satisfy a predefined threshold level for full or partial ZVS operation using the sensed voltage across the sixth switch.

30. The method of claim 29, selectively controlling switches comprising turning the fourth switch and sixth switch ON at the times when the voltage across the sixth switch is substantially zero or satisfies the predetermined threshold level for full or partial ZVS operation.

31. The method of claim 24, monitoring at least one of the voltage across or the current through a component of the secondary power circuit comprising:
sensing a voltage across a resistor; and
using the sensed voltage and the scaling factor A to determine the output current to the load.

32. The method of claim 24, wherein a DC resistance of the second inductor $R_{DC_{LB}}$ and a DC resistance of the first inductor $R_{DC_L}$ have a relationship of: $R_{DC_{LB}} = A^* R_{DC_L}$, a drain to source resistance of the fifth switch $R_{DS_{Q3B}}$ and a drain to source resistance of the third switch have a relationship of: $R_{DS_{Q3B}} = A^* R_{DS_{Q3}}$, a drain to source resistance of the sixth switch $R_{DS_{Q4B}}$ and a drain to source resistance of the fourth switch have a relationship of: $R_{DS_{Q4B}} = A^* R_{DS_{Q4}}$, a capacitance of the fifth switch $C_{OSS_{Q3B}}$ and a capacitance of the third switch $C_{OSS_{Q3}}$ have a relationship of: $C_{OSS_{Q3}} = A^* C_{OSS_{Q3B}}$, and a capacitance of the sixth switch $C_{OSS_{Q4B}}$ and a capacitance of the fourth switch $C_{OSS_{Q4}}$ have a relationship of: $C_{OSS_{Q4}} = A^* C_{OSS_{Q4B}}$.

33. The method of claim 24, wherein the second inductor is connected to the first inductor at a tap between ends of the first inductor, a ratio of a winding number of the first inductor that is tapped to by the second inductor to a total winding number of the first inductor is $n_T/n$, and wherein an inductance of the second inductor $L_B$ and an inductance of the first inductor L have a relationship of $$L_B = \left(\frac{n_T}{n}\right)(A)L.$$

34. The method of claim 24, monitoring at least one of the voltage across or the current through a component of the secondary switching power circuit comprising:
sensing a voltage across the fifth switch; and
using the sensed voltage and the scaling factor A to determine the output current to the load.

* * * * *